United States Patent
Nagar et al.

(10) Patent No.: US 8,874,617 B2
(45) Date of Patent: Oct. 28, 2014

(54) DETERMINING POTENTIAL ENTERPRISE PARTNERSHIPS

(71) Applicant: International Business Machines Corporation, Armonk, NY (US)

(72) Inventors: Seema Nagar, Bangalore (IN); Amit A. Nanavati, New Delhi (IN); Ramasuri Narayanam, Bangalore (IN); Amir Ronen, Haifa (IL); Steven Keller, Columbus, OH (US); Jason Hardy, Powell, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/676,596

(22) Filed: Nov. 14, 2012

(65) Prior Publication Data

US 2014/0136547 A1     May 15, 2014

(51) Int. Cl.
*G06F 7/00*         (2006.01)
*G06F 17/30*       (2006.01)

(52) U.S. Cl.
USPC ........................................................ 707/798

(58) Field of Classification Search
None
See application file for complete search history.

(56) References Cited

U.S. PATENT DOCUMENTS

| | | | |
|---|---|---|---|
| 7,725,354 B2 | 5/2010 | Schwarze et al. | |
| 8,180,804 B1 * | 5/2012 | Narayanan et al. | 707/798 |
| 8,185,558 B1 * | 5/2012 | Narayanan et al. | 707/798 |
| 2003/0014373 A1 | 1/2003 | Perge et al. | |
| 2003/0163340 A1 | 8/2003 | Fitzpatrick et al. | |
| 2004/0024720 A1 * | 2/2004 | Fairweather | 706/46 |
| 2004/0068431 A1 * | 4/2004 | Smith et al. | 705/10 |
| 2004/0083115 A1 * | 4/2004 | Hodges et al. | 705/1 |
| 2004/0243459 A1 * | 12/2004 | Geritz et al. | 705/10 |
| 2005/0010427 A1 | 1/2005 | Bhandarkar et al. | |
| 2005/0108043 A1 | 5/2005 | Davidson | |
| 2005/0149367 A1 * | 7/2005 | Lee et al. | 705/7 |
| 2005/0222883 A1 * | 10/2005 | Goldberg et al. | 705/8 |
| 2005/0246221 A1 * | 11/2005 | Geritz et al. | 705/10 |
| 2006/0184423 A1 | 8/2006 | Krishnamoorthy | |
| 2007/0150856 A1 * | 6/2007 | Warner et al. | 717/106 |
| 2008/0040364 A1 * | 2/2008 | Li | 707/100 |
| 2008/0263035 A1 | 10/2008 | Episale et al. | |

(Continued)

OTHER PUBLICATIONS

Gibson et al., Discovering Large Dense Subgraphs in Massive Graphs, in VLDB, 2005.

(Continued)

*Primary Examiner* — Robert Beausoliel, Jr.
*Assistant Examiner* — Nicholas Allen
(74) *Attorney, Agent, or Firm* — Ryan, Mason & Lewis, LLP (57) ABSTRACT

Techniques, a system and an article of manufacture for determining potential enterprise partnerships. A method includes constructing an interaction graph for a set of multiple enterprises based on information pertaining to each of the enterprises and information pertaining to transactions conducted among the enterprises, and determining at least two candidate partnership teams among the set of enterprises based on at least one attribute of the graph, wherein each candidate partnership team comprises two or more of the enterprises. The method also includes computing a compatibility score for each pair of enterprises in each candidate partnership team based on at least one enterprise parameter, computing a compatibility score for each candidate partnership team based on an aggregation of the compatibility score for each pair of enterprises in each candidate partnership team, and outputting a suggested candidate partnership team based on selection of the highest compatibility score among the candidate partnership teams.

20 Claims, 5 Drawing Sheets

(56) References Cited

U.S. PATENT DOCUMENTS

| | | | |
|---|---|---|---|
| 2008/0270314 A1* | 10/2008 | Birney et al. | 705/80 |
| 2009/0006290 A1* | 1/2009 | Gunawardana et al. | 706/14 |
| 2010/0017219 A1 | 1/2010 | Busch | |
| 2010/0179845 A1* | 7/2010 | Davidson | 705/7 |
| 2010/0205057 A1* | 8/2010 | Hook et al. | 705/14.52 |
| 2010/0228589 A1 | 9/2010 | Tsai | |
| 2011/0178836 A1* | 7/2011 | Seefeld et al. | 705/7.28 |
| 2012/0123816 A1* | 5/2012 | Zhang et al. | 705/7.11 |
| 2012/0330704 A1* | 12/2012 | Davidson | 705/7.11 |
| 2013/0035912 A1* | 2/2013 | Margines | 703/2 |

OTHER PUBLICATIONS

The Initiative for Global Development and Dalberg Global Development Advisors, Business-to-Business Partnerships. 2011 Initiative for Global Development and Dalberg Global Development Advisors.

EU SME Centre. Know Your Partner, May 2012.

Feige et al., The Dense K-Subgraph Problem. Algorithmica, 29(3):410-421, 2001.

* cited by examiner

DETERMINING POTENTIAL ENTERPRISE PARTNERSHIPS

FIELD OF THE INVENTION

Embodiments of the invention generally relate to information technology, and, more particularly, to enterprise collaboration technology.

BACKGROUND

In a marketplace that is becoming increasingly populated and competitive, companies may wish to interact with other related companies but may not know how to effectively identify such companies that are selling to a relevant set of customers for collaboration. Such collaboration might include, for example, a joint venture between two companies that neither buy nor sell to each other, nor are competitors. By way merely of example, such a pair of companies might include a company that manufactures shoes and a company that manufactures socks. Existing approaches for enterprise collaboration, however, do not provide automatic means of arranging such relationships. Accordingly, a need exists to enable automatic identification of potential enterprise partners for forming a team or a joint offering to the market.

SUMMARY

In one aspect of the present invention, techniques for determining potential enterprise partnerships are provided. An exemplary computer-implemented method for automatically determining a candidate partnership between two or more enterprises can include steps of constructing an interaction graph for a set of multiple enterprises based on information pertaining to each of the multiple enterprises and information pertaining to transactions conducted among the multiple enterprises, and determining at least two candidate partnership teams among the set of multiple enterprises based on at least one attribute of the interaction graph, wherein each candidate partnership team comprises two or more of the multiple enterprises. The method also includes computing a compatibility score for each pair of enterprises in each candidate partnership team based on at least one enterprise parameter, computing a compatibility score for each candidate partnership team based on an aggregation of the compatibility score for each pair of enterprises in each candidate partnership team, and outputting a suggested candidate partnership team based on selection of the highest compatibility score among the at least two candidate partnership teams.

In another aspect of the invention, an exemplary computer-implemented method for automatically determining a candidate partnership between two or more enterprises can include steps of determining at least two candidate partnership teams among the set of multiple enterprises based on information pertaining to the multiple enterprises, information pertaining to interaction among the multiple enterprises, and information pertaining to products and/or services provided by the multiple enterprises, wherein each candidate partnership team comprises two or more of the multiple enterprises, and computing a compatibility score for each pair of enterprises in each candidate partnership team based on at least one enterprise parameter. The method additionally includes the steps of computing a compatibility score for each candidate partnership team based on an aggregation of the compatibility score for each pair of enterprises in each candidate partnership team, and identifying a suggested candidate partnership team based on selection of the highest compatibility score among the at least two candidate partnership teams.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes identifying and recommending potential business partners to companies and enterprises. Accordingly, at least one embodiment of the invention includes recommending a set of companies to other companies for forming a team or a joint offering to the market. As further detailed herein, at least one embodiment of the invention includes identifying common clients and common sources amongst two or more enterprises based on an interaction network of each enterprise, and automatically computing compatibility based on the offerings of each enterprise, as well as product coverage in the relevant domain and standing in the market.

Figure 1:
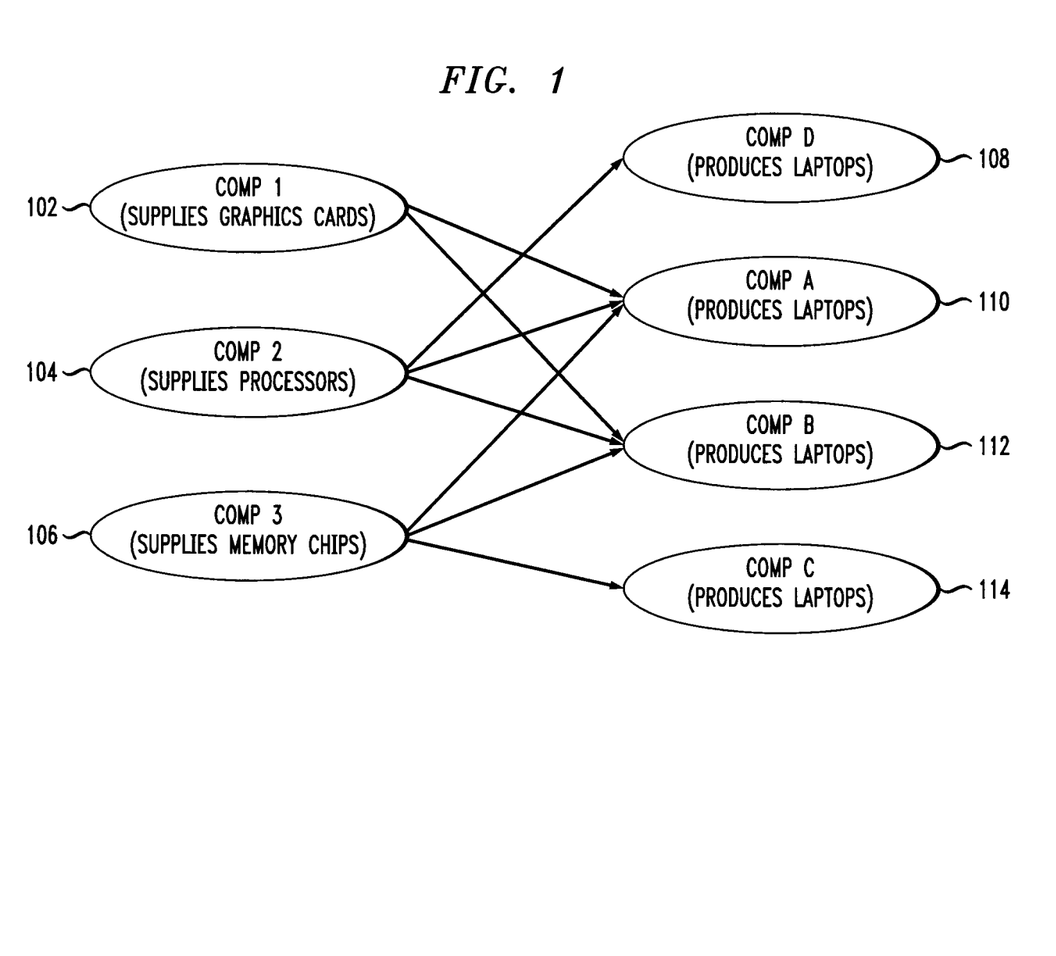
FIG. 1 is a diagram illustrating an example alignment of related companies, according to an embodiment of the present invention.

FIG. 1 is a diagram illustrating an example alignment of related companies, according to an embodiment of the present invention. By way of illustration, FIG. 1 depicts Company1 (102), which supplies graphics cards, Company2 (104), which supplies processors, and Company3 (106), which supplies memory chips. Additionally, the example embodiment depicted in FIG. 1 includes CompanyD (108), CompanyA (110), CompanyB (112) and CompanyC (114), each of which produces laptops.

As depicted in FIG. 1, Company1 (102) has business interactions with CompanyA (110) and CompanyB (112), while Company2 (104) has interactions with CompanyD (108), CompanyA (110) and CompanyB (112), and Company3 (106) has interactions with CompanyA (110), CompanyB (112) and CompanyC (114).

Figure 2:
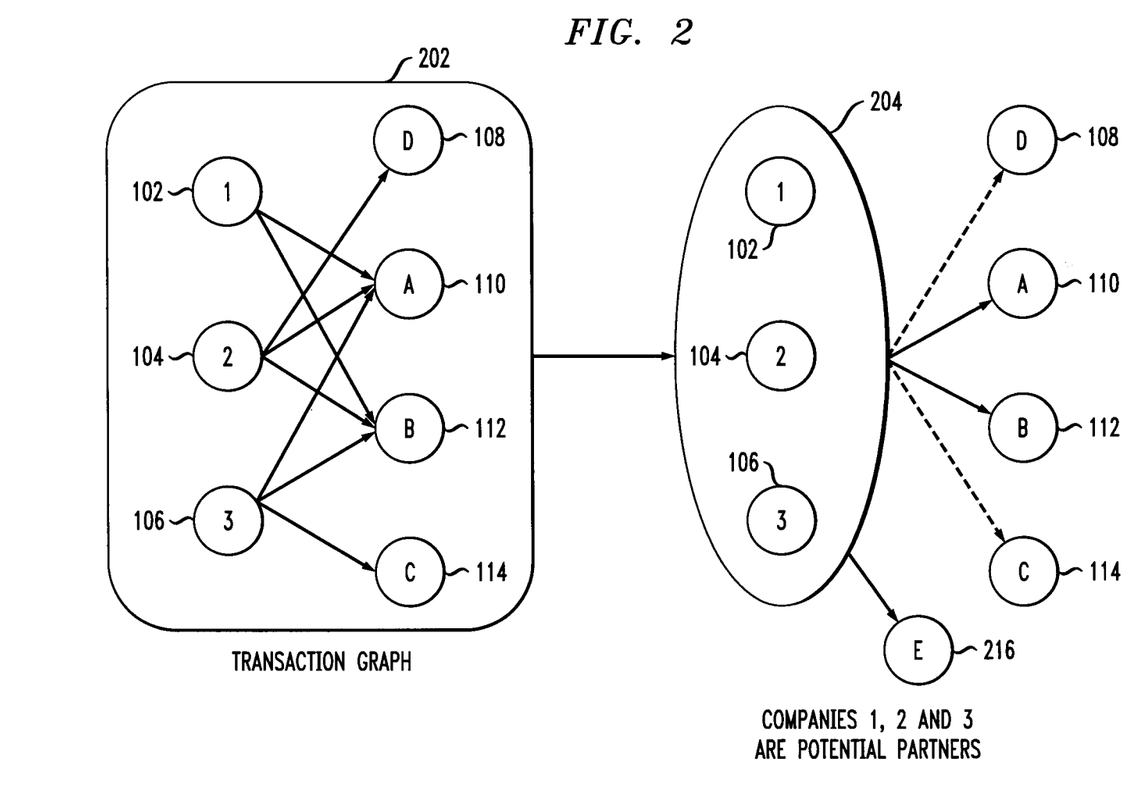
FIG. 2 is a diagram illustrating a continuation of the example alignment of related companies depicted in FIG. 1, according to an embodiment of the invention.

FIG. 2 is a diagram illustrating a continuation of the example alignment of related companies depicted in FIG. 1, according to an embodiment of the invention. By way of illustration, FIG. 2 depicts transaction graph 202, which is the overview of company interactions detailed in FIG. 1. Additionally, as illustrated in FIG. 2, based on an analysis of the interactions within the transaction graph 202, Company1 (102), Company2 (104) and Company3 (106) can be identified and/or grouped as a potential team 204 of partners due to the common interactions each have with CompanyA (110) and CompanyB (112). Also, joint offerings by the new potential team can attempt to attract new customers such as, for instance, Company E (216).

Figure 3:
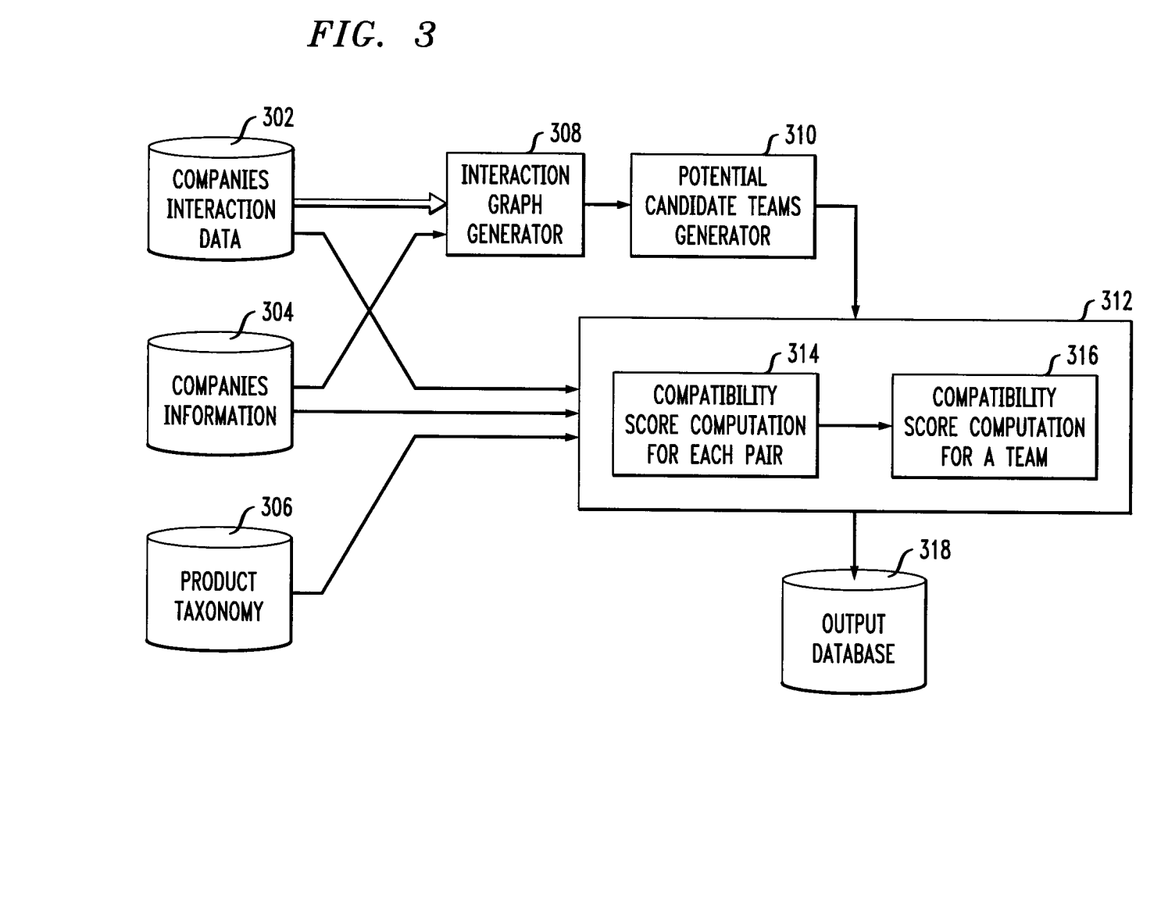
FIG. 3 is a block diagram illustrating an example embodiment, according to an aspect of the invention.

FIG. 3 is a block diagram illustrating an example embodiment, according to an aspect of the invention. By way of illustration, FIG. 3 depicts a company interaction data database 302, a company information database 304 (which can include, for example, information of a company such as geography/region of operation, status as a multinational corporation (MNC) or not, size, revenue, age of the company, and products/services) and a product taxonomy database 306 (which includes information pertaining to relationships among products such as, for example, competing companies, complementary companies and/or raw material used for products), all of which provide input to compatibility scoring module 312. Additionally, company interaction data database 302 also provides input to an interaction graph generator module 308, which subsequently provides input to a potential candidate team generator module 310. As also illustrated by FIG. 3, the potential candidate team generator module 310 additionally provides input to the compatibility scoring module 312.

The compatibility scoring module 312 includes a pair compatibility module 314, which computes a compatibility score for each pair of potential candidate companies and also provides those compatibility scores to a team compatibility module 316, which computes a compatibility score for the potential candidate team encompassing one or more company pairs. Ultimately, the compatibility scoring module 312 outputs the team compatibility score to an output database 318.

In accordance with the example embodiment depicted in FIG. 3, the company interaction data database 302 can include information detailing which company or companies are transacting with other companies. Such information can include, for example, purchase orders, shipment notices, and invoices. This information can be obtained, for example, from a Value Added Network provider. Additionally, the interaction graph generator module 308 generates a company interaction graph, which can be a directed graph. In such a graph, edge attributes can include, for example, transaction types, the number of transactions, dollar values exchanged, and dollar value paid to a network provider. Node attributes can include, for example, a geographic region (or regions) associated with the company, age of the company, company products, and size of the company.

At least one embodiment of the invention includes generating a labeled, directed transaction graph of the companies. This can be done for all companies listed (or present) in company interaction data database 302. Each node in the graph represents a company, and an edge represents when two companies interact with each other. Labels can be applied on each node corresponding to the attributes of the associated company, and can include (as noted above) information such as geographic region (or regions) associated with the company, age of the company, company products, and size of the company. Labels on the edges can be derived from the transaction history between the two companies, and can include (as also noted above) information such as transaction types, the number of transactions, dollar value exchanged, etc.

The potential candidate team generator module 310 can suggest partnerships (or potential candidate teams) among companies, as detailed herein. By way of example, such partnerships can be suggested for companies having a similar set of clients and that are in a same or similar business domain, but are companies that are not doing business with each other. Such partnerships can be suggested for teams of at least m companies, where in at least one embodiment of the invention, m is two or more. Further, additional parameters can be incorporated in a potential partnership determination. By way of example, one such parameter can include identifying only companies that have at least n clients, where n is a predetermined number.

Accordingly, at least one embodiment of the invention includes determining two sets of companies such that companies within Set A are not doing business with each other, companies within Set B are not doing business with each other, and for any two companies in Set A, they have at least k common companies in Set B with whom they are doing business. In accomplishing this objective, at least one embodiment of the invention includes identifying dense bi-partite sub-graphs. Algorithms and heuristics for determining dense bi-partite sub-graphs are taught, for example, in "U. Feige, D. Peleg, and G. Kortsarz. The dense k-subgraph problem. Algorithmica, 29(3):410-421, 200-1" as well as in "D. Gibson, R. Kumar, and A. Tomkins. Discovering Large Dense Subgraphs in Massive Graphs. In Proceedings of VLDB 2005," both of which are incorporated by reference herein.

As also depicted in FIG. 3, the compatibility scoring module 312 computes compatibility scores for potential company partnerships. In continuing with the example embodiment described above, pair compatibility module 314 can compute a compatibility score for any two companies in Set A. This can depend, for example, on parameters such as the number of common clients, geography, the number of times a business transaction was conducted between the two companies, the relevant business domain, complementariness of the products and/or services of the two companies, size and age of the two companies, the types of documents exchanged between the two companies, etc.

Computing this compatibility score can be carried out via one or more techniques. For example, consider the following illustration using the Jaccord Coefficient. Let A and B be two sets of elements and the Jaccord Coefficient of A and B is denoted by $J(A,B)$, and it is defined as the ratio of the number of elements that are present both in A and B to the number of elements that are present either in A or B.

Consider a pair of companies, herein referred to as C1 and C2. Consider a set of properties D, such as number of common clients and types of documents exchanged with other companies, based on which the compatibility score for C1 and C2 will be generated. For each property i in D, let $A_i$ and $B_i$ be the set of elements that satisfies the property i for C1 and C2, respectively. Further, $J(A_i, B_i)$ can be computed for each i in D. Accordingly, computing the compatibility score for C1 and C2 includes taking the average (or sum or maximum or minimum) of the quantities $J(A_i,B_i)$.

Additionally, the team compatibility module 316 can compute a compatibility score for a candidate team of companies in Set A. In at least one embodiment of the invention, a team constitutes at least two companies. Further, in this example, team is the same team which potential candidate team generator module 310 provides to compatibility scoring module 312. This computation can be based, for example, on the pair-wise compatibility scores computed by pair compatibility module 314, wherein an aggregate group score is determined therefrom. At least one embodiment of the invention includes computing such an aggregate score based on the pair-wise compatibility scores and "coverage" of the group as a whole in the relevant business domain. Such coverage can include considerations of market coverage as well as product/service coverage.

In accordance with at least one embodiment of the invention, multiple techniques can be used to compute the team compatibility score from a set of pair-wise compatibility scores. By way of example, consider a team T that includes k companies, namely, $T=\{C1, C2, \ldots, Ck\}$. Using the compatibility computation techniques described above, pair-wise compatibility scores for the companies in T can also be computed. To compute the compatibility score for T, the average or the sum or the maximum or the minimum of these pair-wise compatibility scores for the companies in T is taken. Further, in at least one embodiment of the invention, the final score is used in the selection process. For example, a team with the highest score can be selected. Additionally, the scores above which a team should be selected as a potential team can be supplied manually.

Figure 4:
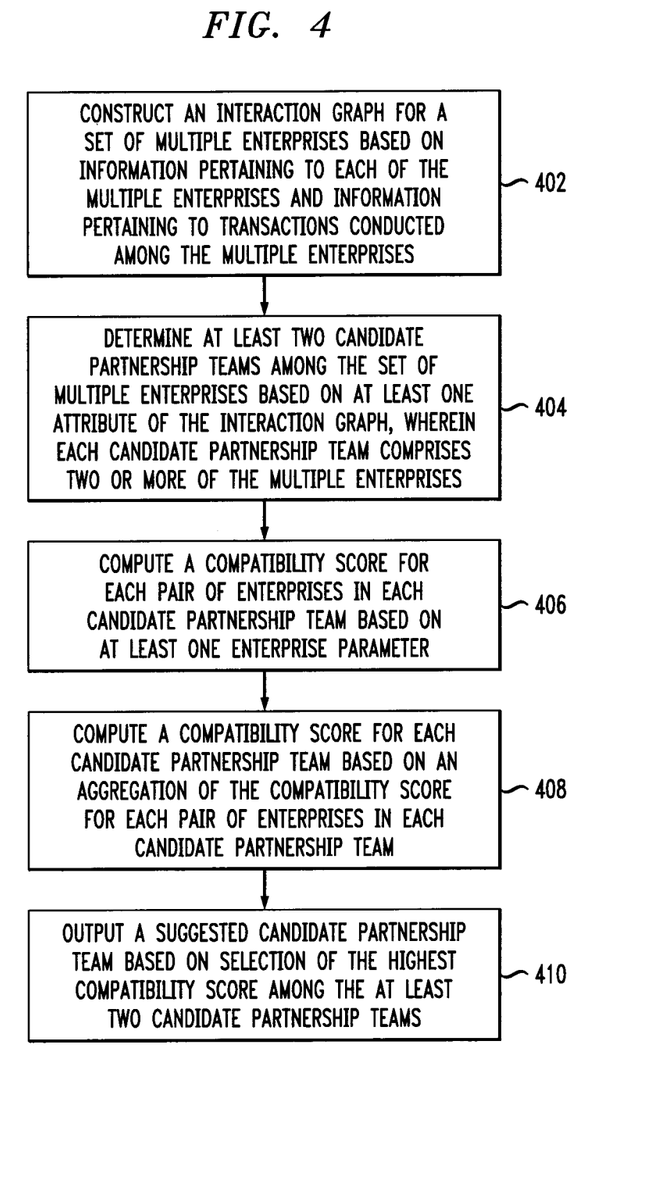
FIG. 4 is a flow diagram illustrating techniques for automatically determining a candidate partnership between two or more enterprises, according to an embodiment of the invention.

FIG. 4 is a flow diagram illustrating techniques for automatically determining a candidate partnership between two or more enterprises, according to an embodiment of the invention. Step 402 includes constructing an interaction graph for a set of multiple enterprises based on information pertaining to each of the multiple enterprises and information pertaining to transactions conducted among the multiple enterprises. Information pertaining to transactions conducted among the multiple enterprises can include, for example, purchase orders, shipment notices, and/or invoices.

As described herein, constructing an interaction graph includes identifying each node in the interaction graph as an enterprise. This can further include applying a label to each node, wherein said label corresponds to an attribute of the associated enterprise. Attributes can include, for example, a geographic region associated with the enterprise, age of the enterprise, one or more enterprise products or services, size of the enterprise, and identification of one or more clients of the enterprise.

Constructing an interaction graph can also include identifying each edge as an instance of two enterprises conducting a transaction with each other. This can additionally include applying a label to each edge, wherein said label corresponds to information pertaining to a transaction history between the two relevant enterprises. Such information, as noted herein, can include one or more transaction types, number of transactions, dollar value exchanged over the transaction history, etc.

Step 404 includes determining at least two candidate partnership teams among the set of multiple enterprises based on at least one attribute of the interaction graph, wherein each candidate partnership team comprises two or more of the multiple enterprises. This determination can be made, for example, via identifying one or more dense bi-partite subgraphs.

Step 406 includes computing a compatibility score for each pair of enterprises in each candidate partnership team based on at least one enterprise parameter. Enterprise parameters can include, for example, the number of common clients between enterprises, enterprise geography, the number of conducted transactions between enterprises, enterprise domain, product domain, service domain, enterprise size, and/or enterprise age.

Step 408 includes computing a compatibility score for each candidate partnership team based on an aggregation of the compatibility score for each pair of enterprises in each candidate partnership team. Step 410 includes outputting a suggested candidate partnership team based on selection of the highest compatibility score among the at least two candidate partnership teams.

Additionally, as detailed herein, at least one embodiment of the invention can also include a technique for automatically determining a candidate partnership between two or more enterprises that includes determining at least two candidate partnership teams among the set of multiple enterprises based on information pertaining to the multiple enterprises, information pertaining to interaction among the multiple enterprises, and information pertaining to products and/or services provided by the multiple enterprises, wherein each candidate partnership team comprises two or more of the multiple enterprises. Such a technique further includes computing a compatibility score for each pair of enterprises in each candidate partnership team based on at least one enterprise parameter, computing a compatibility score for each candidate partnership team based on an aggregation of the compatibility score for each pair of enterprises in each candidate partnership team, and identifying a suggested candidate partnership team based on selection of the highest compatibility score among the at least two candidate partnership teams.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
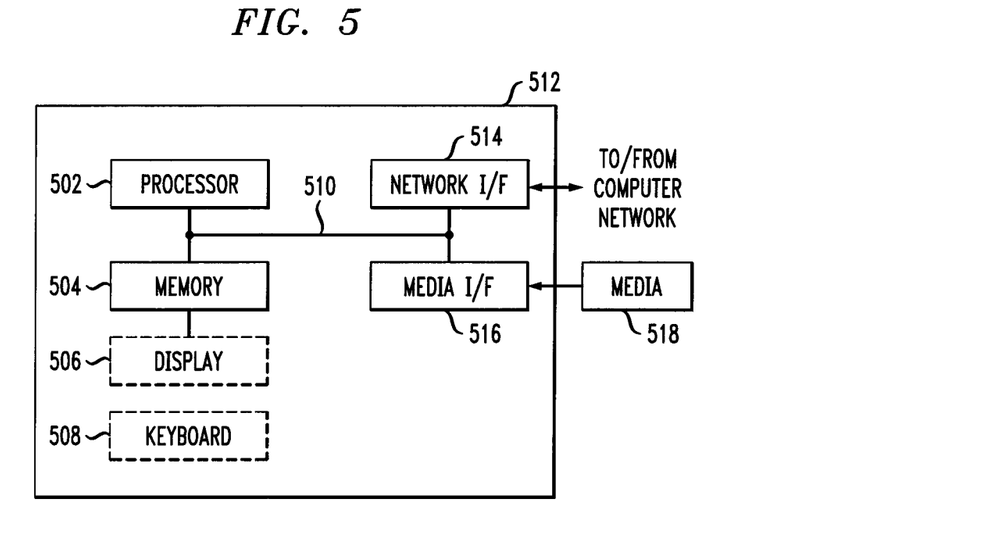
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, computing potential enterprise teams from mapping companies' attributes and transaction relationships on a transaction graph.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically determining a candidate partnership between two or more enterprises, the method comprising:

constructing an interaction graph for a set of multiple enterprises based on information pertaining to each of the multiple enterprises and information pertaining to transactions conducted among the multiple enterprises;

determining at least two candidate partnership teams among the set of multiple enterprises based on at least one attribute of the interaction graph, wherein each candidate partnership team comprises two or more of the multiple enterprises;

computing a compatibility score for each pair of enterprises in each candidate partnership team based on multiple enterprise parameters, wherein said multiple enterprise parameters comprise at least (i) a relatedness of enterprise domain across the two or more enterprises in each candidate partnership team, (ii) a pre-determined number of common clients across the two or more enterprises in each candidate partnership team, and (iii) a pre-determined number of past transactions conducted between the two or more enterprises in each candidate partnership team;

computing a compatibility score for each candidate partnership team based on an aggregation of the compatibility score for each pair of enterprises in each candidate partnership team; and outputting a suggested candidate partnership team based on selection of the highest compatibility score among the at least two candidate partnership teams;

wherein at least one of the steps is carried out by a computer device.

2. The method of claim 1, wherein said information pertaining to transactions conducted among the multiple enterprises comprises purchase orders, shipment notices, and/or invoices.

3. The method of claim 1, wherein said constructing an interaction graph comprises identifying each node in the interaction graph as an enterprise.

4. The method of claim 3, comprising applying a label to each node, wherein said label corresponds to an attribute of the associated enterprise.

5. The method of claim 4, wherein said attribute comprises a geographic region associated with the enterprise.

6. The method of claim 4, wherein said attribute comprises age of the enterprise.

7. The method of claim 4, wherein said attribute comprises one or more enterprise products.

8. The method of claim 4, wherein said attribute comprises one or more enterprise services.

9. The method of claim 4, wherein said attribute comprises size of the enterprise.

10. The method of claim 4, wherein said attribute comprises identification of one or more clients of the enterprise.

11. The method of claim 1, wherein said constructing an interaction graph comprises identifying each edge as an instance of two enterprises conducting a transaction with each other.

12. The method of claim 11, comprising applying a label to each edge, wherein said label corresponds to information pertaining to a transaction history between the two relevant enterprises.

13. The method of claim 12, wherein said information comprises one or more transaction types.

14. The method of claim 12, wherein said information comprises the number of transactions.

15. The method of claim 12, wherein said information comprises dollar value exchanged over the transaction history.

16. The method of claim 1, wherein said determining comprises identifying one or more dense bi-partite sub-graphs.

17. The method of claim 1, wherein said multiple enterprise parameters further comprise enterprise geography, the number of conducted transactions between enterprises, product domain, service domain, enterprise size, and/or enterprise age.

18. An article of manufacture comprising a computer readable storage medium having computer readable instructions tangibly embodied thereon which, when implemented, cause a computer to carry out a plurality of method steps comprising:
constructing an interaction graph for a set of multiple enterprises based on information pertaining to each of the multiple enterprises and information pertaining to transactions conducted among the multiple enterprises;
determining at least two candidate partnership teams among the set of multiple enterprises based on at least one attribute of the interaction graph, wherein each candidate partnership team comprises two or more of the multiple enterprises;
computing a compatibility score for each pair of enterprises in each candidate partnership team based on multiple enterprise parameters, wherein said multiple enterprise parameters comprise at least (i) a relatedness of enterprise domain across the two or more enterprises in each candidate partnership team, (ii) a pre-determined number of common clients across the two or more enterprises in each candidate partnership team, and (iii) a pre-determined number of past transactions conducted between the two or more enterprises in each candidate partnership team;
computing a compatibility score for each candidate partnership team based on an aggregation of the compatibility score for each pair of enterprises in each candidate partnership team; and
outputting a suggested candidate partnership team based on selection of the highest compatibility score among the at least two candidate partnership teams.

19. A system for automatically determining a candidate partnership between two or more enterprises, comprising:
at least one distinct software module, each distinct software module being embodied on a tangible computer-readable medium;
a memory; and
at least one processor coupled to the memory and operative for:
constructing an interaction graph for a set of multiple enterprises based on information pertaining to each of the multiple enterprises and information pertaining to transactions conducted among the multiple enterprises;
determining at least two candidate partnership teams among the set of multiple enterprises based on at least one attribute of the interaction graph, wherein each candidate partnership team comprises two or more of the multiple enterprises;
computing a compatibility score for each pair of enterprises in each candidate partnership team based on multiple enterprise parameters, wherein said multiple enterprise parameters comprise at least (i) a relatedness of enterprise domain across the two or more enterprises in each candidate partnership team, (ii) a pre-determined number of common clients across the two or more enterprises in each candidate partnership team, and (iii) a pre-determined number of past transactions conducted between the two or more enterprises in each candidate partnership team;
computing a compatibility score for each candidate partnership team based on an aggregation of the compatibility score for each pair of enterprises in each candidate partnership team; and
outputting a suggested candidate partnership team based on selection of the highest compatibility score among the at least two candidate partnership teams.

20. A method for automatically determining a candidate partnership between two or more enterprises, the method comprising:
determining at least two candidate partnership teams among the set of multiple enterprises based on information pertaining to the multiple enterprises, information pertaining to interaction among the multiple enterprises, and information pertaining to products and/or services provided by the multiple enterprises, wherein each candidate partnership team comprises two or more of the multiple enterprises;
computing a compatibility score for each pair of enterprises in each candidate partnership team based on multiple enterprise parameters, wherein said multiple enterprise parameters comprise at least (i) a relatedness of enterprise domain across the two or more enterprises in each candidate partnership team, (ii) a pre-determined number of common clients across the two or more enterprises in each candidate partnership team and (iii) a pre-determined number of past transactions conducted between the two or more enterprises in each candidate partnership team;

computing a compatibility score for each candidate partnership team based on an aggregation of the compatibility score for each pair of enterprises in each candidate partnership team; and identifying a suggested candidate partnership team based on selection of the highest compatibility score among the at least two candidate partnership teams;

wherein at least one of the steps is carried out by a computer device.

* * * * *